United States Patent [19]
Musgrove

[11] Patent Number: 5,119,708
[45] Date of Patent: Jun. 9, 1992

[54] CURVED BLADES FOR RECIPROCATING SAWS

[76] Inventor: Joseph Musgrove, P.O. Box 1215, Hayden, Id. 83835

[21] Appl. No.: 686,337

[22] Filed: Apr. 17, 1991

[51] Int. Cl.[5] .............................................. B27B 33/02
[52] U.S. Cl. ...................................... 83/835; 83/697; 30/355; 30/394
[58] Field of Search ................ 83/852, 847, 835, 697, 83/846, 848; 30/392, 393, 394, 314, 345, 350, 356, 502, 355; 606/176, 177, 178; 76/112, 25.1, 101.1

[56] References Cited

U.S. PATENT DOCUMENTS

| | | | |
|---|---|---|---|
| 229,772 | 7/1880 | Suisse | 83/852 |
| 1,481,055 | 1/1924 | Fullbright | 30/394 X |
| 3,496,973 | 2/1970 | Ballard | 83/835 |
| 4,907,344 | 3/1990 | Hahn | 30/355 |

FOREIGN PATENT DOCUMENTS

| | | | |
|---|---|---|---|
| 274220 | 7/1988 | European Pat. Off. | 30/355 |
| 715294 | 9/1954 | United Kingdom | 83/847 |

Primary Examiner—Douglas D. Watts
Assistant Examiner—Clark F. Dexter
Attorney, Agent, or Firm—Glenna Hendricks

[57] ABSTRACT

This invention relates to saw blades for use in reciprocating hand-manipulated saws. The blades of the invention have a straight, untoothed edge lying parallel to the longitudinal axis of the blade and a toothed edge wherein at least 30% of the toothed edge is curved.

10 Claims, 2 Drawing Sheets

CURVED BLADES FOR RECIPROCATING SAWS

This invention relates to saw blades for use in reciprocating hand-manipulated saws. The blades of the invention have a straight, untoothed edge lying parallel to the longitudinal axis of the blade and a toothed edge wherein at least 30% of the toothed edge is curved.

BACKGROUND OF THE INVENTION

The use of reciprocating saws that are hand manipulated has simplified the work of both the professional carpenter and the handy homeowner. Such saws are portable and easily manipulated in many work situations. However, most of the blades on the market are not easily manipulated in situations wherein there is need to cut into a corner where the planes of two boards meet at a 90° angle. Furthermore, most blades are not appropriate for starting a cut lying wholly in the plane of the material. While there have previously been disclosed "self-starting" blades, most such blades are special purpose blades that are too fragile or specialized for general use. Finally, many of the blades on the market are made of material of such hardness that they can not be sharpened with the files usually used by carpenters. For example, some of the blades on the market are flame or electro hardened to attain a hardness of about 60 to 62 on the Rockwell scale. Since that is about the hardness of files, such blades are not readily sharpened during the course of use.

There have been blades previously disclosed as self-starting having curved or non-parallel edges. U.S. Pat. No. 3,680,610 to Lindgren describes a blade with two cutting edges for plunging into a planar surface. The blade has oppositely disposed cutting edges. U.S. Pat. No. 3,477,479 to Doty describes a blade having a curved end to enable self-starting of the cut in a planar surface. The non-cutting edge is not parallel to the axis of the blade. The blade is not useful for cutting into corners where two planar surfaces meet at a 90° angle.

SUMMARY OF THE INVENTION

It is the purpose of this invention to provide blades for use in reciprocating saws that ar useful for self-starting cuts in planar surfaces. The blades of the invention are sufficiently strong for general use in the building trades and are of appropriate hardness to allow for sharpening with files usually used in the building trade. The blades of the invention are of sufficient thickness to provide needed strength, the thickness being about 0.08 to 0.095 inches on the untoothed edge.

DETAILED DESCRIPTION OF THE INVENTION

Figures 1A, 1B:
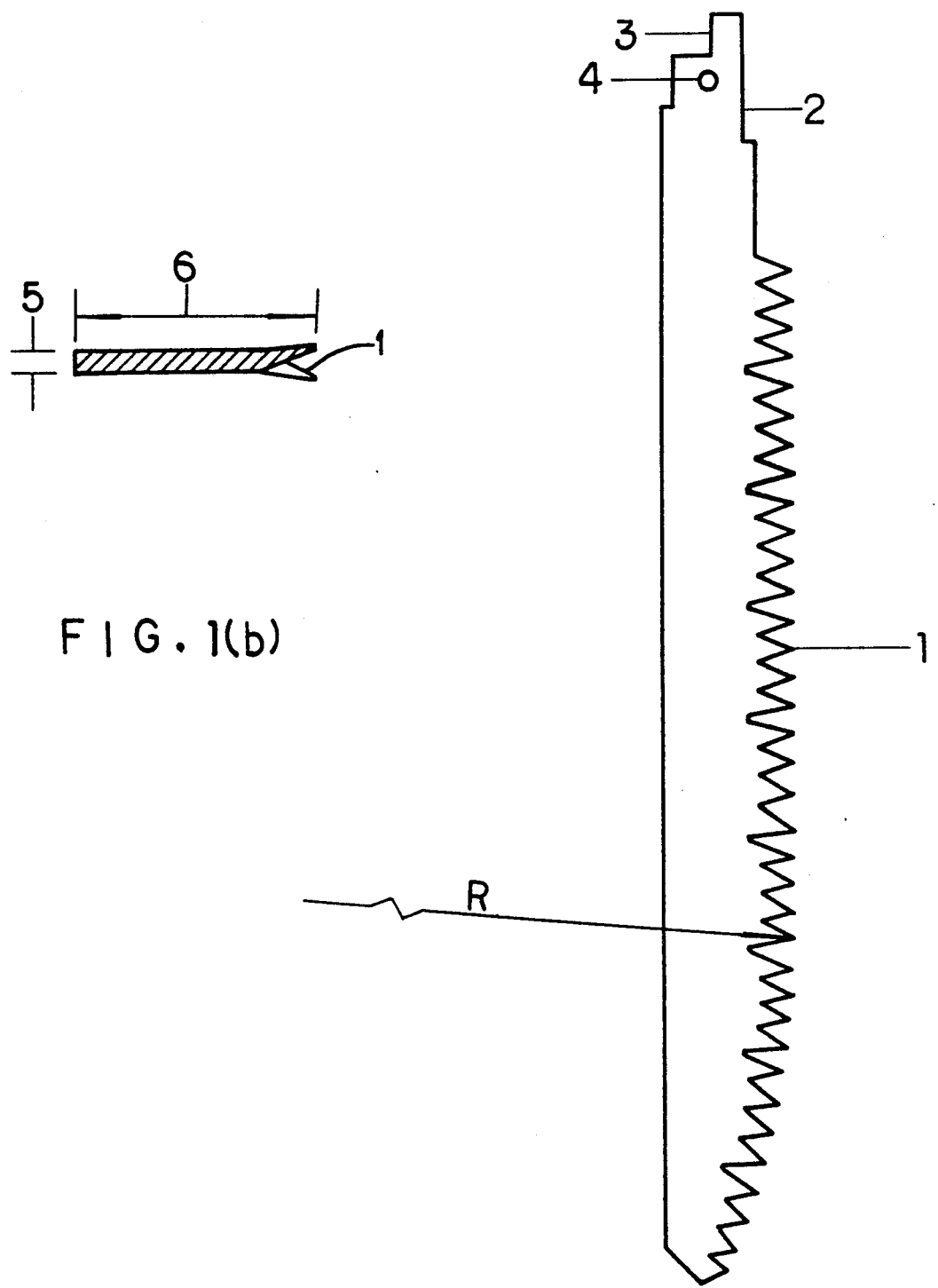
FIGS. 1(a) and 1(b) depict a blade that will self-start a cut in a planar surface, said blade having an untoothed edge that is parallel to the axis of the blade and a toothed edge having a part of the toothed edge essentially parallel with the axis of the blade and a part of the toothed edge curved toward the untoothed edge. The blade is useful for general carpentry work.

Referring to the drawing, and particularly to FIG. 1, the blade is particularly useful for remodeling work wherein there is need to cut into a corner where two planes meet at a 90° angle. The blade can be used to cut one piece of lumber up to, but not into, a second piece with a surface lying perpendicular to the plane of the first piece of lumber. The teeth 1 in the drawing are about 5 to 6 per inch on a blade for use in general remodeling work. However, in a blade for use in making finishing cuts or for use on finished surfaces there could be as many as 12 teeth per inch. The shank portion 2 has an offset or terminal portion 3 and an aperture 4 therein for mounting into a conventional reciprocating saw. The body of the saw blade, including the shank portion, has, in a preferred embodiment, a total length of about 9 to 10 inches with about 7 to 8 inches of teeth. The blade has a thickness 5 of about 0.080 to 0.095 inches (FIG. 1(b)), a depth 6 of 1 to 1 ½ inches, and a cut having a Kerf of about 0.090 to 0.175 inches. In a preferred embodiment, when the blade is about 1 ½ inches deep and one half of the toothed edge is curved, the toothed edge converges toward the straight edge on a curve having a radius of about 12 inches. While the size of the blade having the configuration shown in the drawing may vary without departing from the spirit of the invention, a blade having the dimensions suggested has proven to be particularly useful for general carpentry, especially for use in remodeling. Because the curved toothed portion essentially converges to a point, the end of the blade is particularly useful for cutting into tight corners where 2 planes meet at an angle.

Blades of the general configuration shown in FIG. 1 may vary in length from about 7 to about 11 inches. However, the 9 to 10 inch blades have been found to be particularly appropriate. At least 30% of the toothed portion should be curved. However, it is preferred that 40% to 60% of the toothed portion be curved with 45% to 55% being more preferred. While the depth of the blade may vary considerably, the preferred depth for general carpentry work is 1 to 1 ½ inches. The number of teeth per inch will vary according to the work for which a blade of the invention is particularly adapted and may vary from 5 to 12 teeth per inch. For use in general carpentry such as cutting out windows in plywood about 5 to 8 teeth per inch is appropriate. For use on finer work as many as 12 teeth per inch would be appropriate.

A preferred material for production of the blades is 0.1 tool steel. To provide hardness of about 51 to 52 on the Rockwell scale the steel was quenched in oil at 1500° F., then baked at 400° F. for one hour. The preferred method provided blades that could be sharpened using files ordinarily carried by carpenters.

Figure 2B:
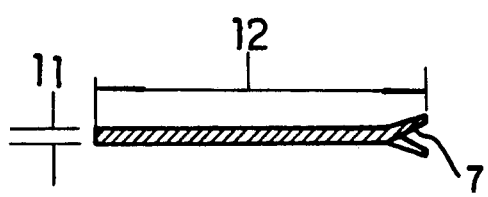
FIGS. 2(a) and 2(b) depict a blade that will self-start a cut in a planar surface having an untoothed edge that is parallel to the axis of the blade and a toothed edge wherein the entire toothed portion is curved. The blade is particularly adapted for use for cutting finer panelling and for similar uses.
Figure 2A:
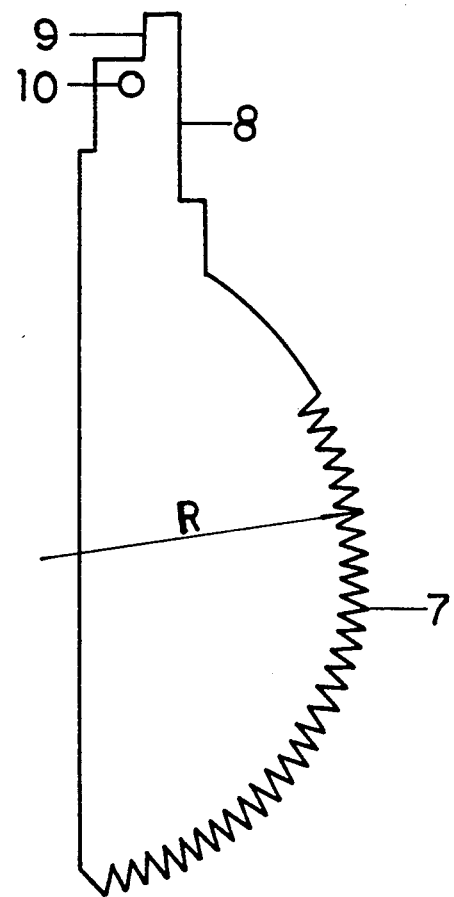

Referring to FIG. 2, the blade wherein the entire toothed portion is curved is particularly useful for cutting fine panelling. In a preferred embodiment, about 3 to 4 inches of the length of the blade has an edge 7 that is curved and toothed. The shank portion has an offset or terminal portion 9 and an aperture 10 for mounting into a reciprocal saw. The blade has a thickness 11 of about 0.08 to 0.09 inches at the untoothed edge (FIG. 2(b)) a depth of about 1.75 inches (FIG. 2(b)) and producing a kerf of about 0.100. The curve of the blade as drawn is about a radius of approximately 2 inches.

The blade shown in FIG. 2 can be made of the same material as the blade of FIG i subjected to the same treatment as 10 taught above. It is to understood, however, that any means known in the art for treating metal to attain the appropriate hardness can be used in making any blade of the invention.

Figure 3:
FIG. 3 is a fragmentary view of the teeth of the blade shown in FIG. 1.

Referring to FIG. 3, in a preferred embodiment the teeth are constructed so that the teeth are alternately oppositely faced. Each tooth has face for cutting perpendicular to the wood face. The blade will cut during both forward and backward movements. It should be understood that such arrangement of the teeth, while often beneficial, is not intended as a limitation, but only a description of one embodiment.

I claim:

1. A blade with a shank adapted to fit into a reciprocating saw, said blade having an untoothed edge lying parallel to the longitudinal axis of the blade and a saw-toothed edge wherein only 30% to 60% of the of the toothed edge is curved, said untoothed edge and said saw-toothed edge essentially converging to a point at the end of the blade.

2. A blade of claim 1 wherein only 40% to 60% of said saw-toothed edge of the blade is curved.

3. A blade of claim 16 wherein only 45% to 55% of said saw-toothed edge is curved.

4. A blade of claim 3 having a thickness of 0.08 to 0.095 inches at the untoothed edge and a hardness of 50 to 52 on the Rockwell scale.

5. A blade of claim 4 having 5 to 8 teeth to the inch.

6. A blade of claim 4 wherein the saw-teeth are alternately oppositely faced.

7. A blade of claim 1 having a thickness of 0.08 to 0.095 inches at the untoothed edge.

8. A blade of claim 1 having a hardness of 50 to 52 on the Rockwell scale.

9. A blade of claim 1 wherein the saw-teeth are alternately oppositely faced.

10. A blade of claim 1 wherein the blade has a thickness of 0.090 to 0.125.

* * * * *

UNITED STATES PATENT AND TRADEMARK OFFICE
CERTIFICATE OF CORRECTION

PATENT NO. : 5,119,708
DATED : June 9, 1992
INVENTOR(S) : Musgrove

It is certified that error appears in the above-indentified patent and that said Letters Patent is hereby corrected as shown below:

Column 4, line 5 reads as:
   3. A blade of claim 16 wherein...

Should read as:
   3. A blade of claim 1 wherein...

Signed and Sealed this

Twentieth Day of September, 1994

Attest:

BRUCE LEHMAN

*Attesting Officer*     *Commissioner of Patents and Trademarks*